(12) United States Patent
Charvoz

(10) Patent No.: US 8,621,807 B2
(45) Date of Patent: Jan. 7, 2014

(54) PROCESS FOR THE PRODUCTION OF PANELS WITH INTEGRATED INSULATION FOR THE PRODUCTION OF BUILDINGS, PANELS THUS PRODUCED

(75) Inventor: Laurent Charvoz, Levroux (FR)

(73) Assignee: Maisons Naturelles en Beton de Chanvre, Neung sur Beuvron (FR)

( * ) Notice: Subject to any disclaimer, the term of this patent is extended or adjusted under 35 U.S.C. 154(b) by 178 days.

(21) Appl. No.: 12/846,046

(22) Filed: Jul. 29, 2010

(65) Prior Publication Data

US 2011/0023397 A1 Feb. 3, 2011

(30) Foreign Application Priority Data

Jul. 29, 2009 (FR) ...................................... 09 55305

(51) Int. Cl.
*E04B 1/18* (2006.01)
(52) U.S. Cl.
USPC ............................................ 52/414; 52/583.1
(58) Field of Classification Search
USPC ........... 52/414, 745.19, 309.7, 309.11, 405.3, 52/583.1; 264/34, 35, 255, 256
See application file for complete search history.

(56) References Cited

U.S. PATENT DOCUMENTS

| | | | | | |
|---|---|---|---|---|---|
| 3,922,413 | A | * | 11/1975 | Reineman | 428/119 |
| 4,316,925 | A | * | 2/1982 | Delmonte | 428/105 |
| 5,440,845 | A | * | 8/1995 | Tadros et al. | 52/309.12 |
| 5,697,189 | A | * | 12/1997 | Miller et al. | 52/79.9 |
| 6,000,194 | A | * | 12/1999 | Nakamura | 52/783.17 |
| 6,272,805 | B1 | | 8/2001 | Ritter et al. | |
| 6,438,923 | B2 | * | 8/2002 | Miller | 52/745.19 |
| 2001/0045077 | A1 | | 11/2001 | Miller | |

FOREIGN PATENT DOCUMENTS

DE 869 767 C 3/1953
WO 94/28264 A1 12/1994

OTHER PUBLICATIONS

French Search Report, dated May 4, 2010, from corresponding French application.

\* cited by examiner

*Primary Examiner* — Basil Katcheves
(74) *Attorney, Agent, or Firm* — Young & Thompson

(57) ABSTRACT

A process for the production of panels (10) with integrated insulation in particular for the production of buildings, includes the following stages:
 pouring a concrete that includes natural fibers into a mold M to form an interior surface (12) of the panel,
 pouring a light hydrophobic concrete, with reinforcements, to form an exterior surface (14) of the panel,
 adjustment of reinforcements (28) on the edge of each panel to ensure a cottering and adjustment of chain reinforcements (32). Also described are the panels obtained by the process.

17 Claims, 6 Drawing Sheets

Figure 1:
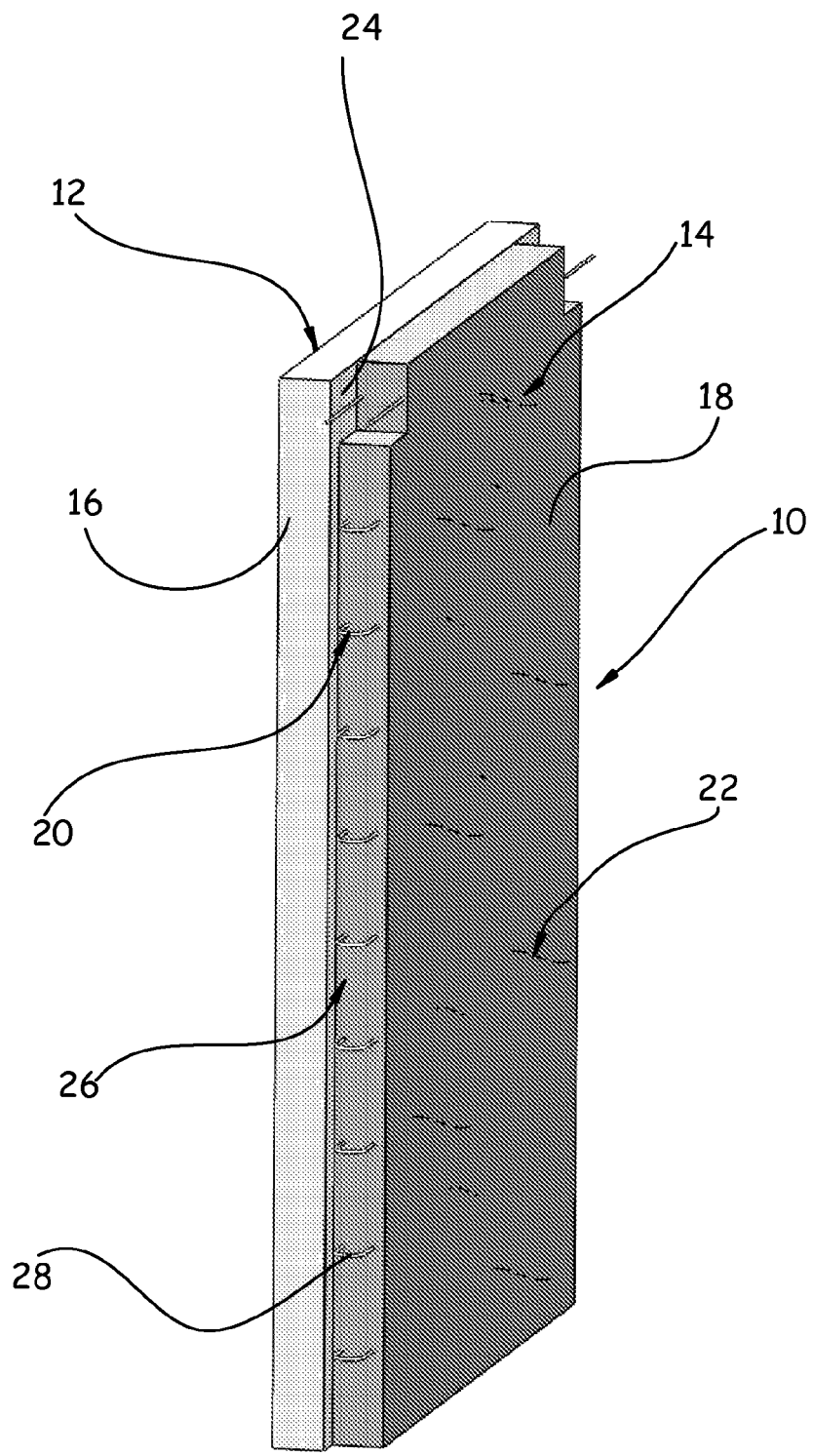

PROCESS FOR THE PRODUCTION OF PANELS WITH INTEGRATED INSULATION FOR THE PRODUCTION OF BUILDINGS, PANELS THUS PRODUCED

BACKGROUND OF THE INVENTION

1. Field of the Invention

This invention relates to a process for the production of panels with integrated insulation in particular for the production of buildings.

The invention also covers the panel that is thus obtained.

Means for producing walls of buildings are known.

2. Description of the Related Art

One process consists in raising the walls with bricks or bond stones connected with mortar with the pouring of posts and other lintels to ensure the uptake of mechanical forces and then connecting insulation through the exterior but most often through the interior.

This interior insulation is based on synthetic materials such as polystyrene with a lining of plaster plates or glass-wool-based plates and a partition of plaster tiles or combinations of these solutions. Insulation by means of synthetic materials that are derived from petroleum derivatives or energy hogs in production is not ideal.

Natural materials such as hemp exist and exhibit numerous advantages, such as a high insulating capacity, renewable production, recycling or problem-free elimination, and a reasonable cost even with small-scale production runs.

The drawback of these materials is their weak strength and their propensity to absorb moisture and therefore to be not suitable for use in the presence of water, in particular in insulation through the exterior.

In addition, construction has changed greatly, and buildings are to be produced as quickly as possible.

It is therefore necessary to produce panels at the factory with high-production means with a very high reproducibility, great precision, and very good quality so as to enable assembly adjusted at the installation site.

These panels are also to be able to be installed easily with low-power lifting means that are commonly available on site.

During prefabrication, it is increasingly required to integrate the equipment such as the casings of the woodwork of openings, the sheathings of electrical cables and heating pipes, etc., and connection housings.

Such panels should also have adequate mechanical strength characteristics to allow an elevation to at least R+1.

Finally, the panels are to be connected to one another mechanically in a satisfactory manner, primarily without having a detrimental effect on the insulation therefore by eliminating the thermal bridges.

SUMMARY OF THE INVENTION

For this purpose, this invention proposes a process for the production of a panel for the production of a building, integrating natural fibers and ready to install.

The invention also covers the panel that is thus obtained by the process.

BRIEF DESCRIPTION OF THE DRAWING FIGURES

The process is described according to a particular nonlimiting embodiment relative to the accompanying drawings that show in the different figures:

FIG. 1: A view of a panel that is obtained by the process according to the invention, FIG. 2: A view of two facade panels, installed in the same plane, ready to be connected, FIG. 3: A view of two angled panels, installed, ready to be connected, FIG. 4: A detailed view of the angled arrangement, FIG. 5: A view of the connection of the two angled panels, FIG. 6: A detailed view of the angled connection, FIG. 7: A view of the production of a structured panel, and FIGS. 8A, 8B and 8C: Views of an enhanced embodiment.

DETAILED DESCRIPTION OF THE INVENTION

FIG. 1 shows a panel 10 according to this invention, comprising at least one interior surface 12 and one exterior surface 14.

The interior surface 12 consists of a concrete 16 made of natural fibers, in this case hemp fibers. The natural fibers could have been selected in the same way from among flax, straw and/or wood chips or a combination of natural fibers.

It is possible to cite as an example the composition of hemp concrete having the following formulations:

The percentages are expressed in terms of mass.

EXAMPLE 1

The reed is the central and soft part of the hemp rod.

Fibrous reed: 11.0%
Standard reed: 5.5%
Lime binder: 34.0%
Sufficient quantity of water This makes it possible to produce panels with a thickness of 18 cm that have a thermal conductivity of 0.08 W/m.K and a dry-state density of 350 kg/m$^3$.

This concrete is produced by mixing in a unit of known type that comprises a blade mixer so as to obtain a good distribution of fibers in the mass.

The process consists in depositing this natural hemp-fiber-based concrete in a monolithic layer in a mold M.

Advantageously, this mold comprises, pre-positioned, the casings of the woodwork of openings with their margins as well as the service sheathings provided for accommodating fluid intake tubes and electrical cables and communication cables that are thus subsequently embedded in this concrete layer of natural fibers.

The exterior surface 14 consists of a light hydrophobic concrete 18.

Such a concrete has significant mechanical strength, and primarily this layer includes reinforcements 20, as will be explained further.

As a structural concrete, it is possible to mention the following composition whose percentages are expressed in terms of mass:

Cement: 23.0%
Sand: 40.0%
0/5 Expanded clay: 12.0%
5/15 Expanded clay: 12.0%
Sufficient quantity of water Significant compression resistance is obtained at 28 days since it is greater than 15 MPa. The density is 1,550 kg/m$^3$ and allows the production of walls with a thickness of 18 cm and with a thermal conductivity of 0.70 W/m.k.

There is a problem for the production of these panels at the interface between the two layers.

Actually, to ensure the engagement of the two surfaces, it is provided to insert mechanical connectors 22, for example metal connectors, into the first concrete of natural fibers that are projecting so as to have these projecting ends embedded in the light concrete layer.

To ensure a quality interface between the two layers and to make possible the superposition of the two layers before hardening, surprisingly enough the patent holders noted that an additional layer 24 of silica material, for example a slip of silica material, makes it possible to ensure a satisfactory interface without having a detrimental effect on the mechanical strength of the unit and without altering the insulating and mechanical properties from one or the other of the surfaces.

After the concrete sets and drying has been done sufficiently, the panels can be manipulated in a known way by industrial manufacturing of concrete panels, generally by means of eye anchors previously embedded in the panel.

The process also provides a system 26 for connecting panels to one another according to the various arrangements that are necessary in a building, facade panels or angled panels. In this case, only an exit angle is shown, but the same would hold true for a return angle. The angles are 90° angles, but in the same way they could be less than or greater than 90° without thereby modifying the scope of this patent application.

Figure 2:
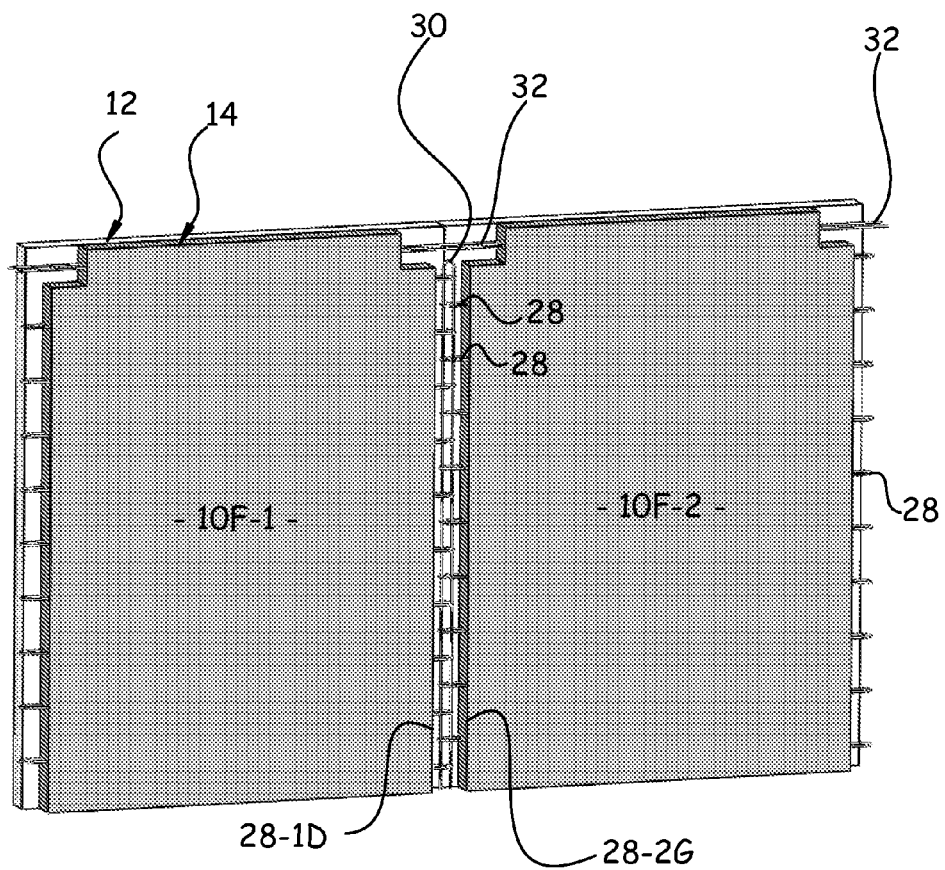

The connecting system 26 for the facade panels is illustrated in FIGS. 1 and 2.

Each facade panel 10F comprises pins 28 that project over the vertical lateral edges.

These pins 28 are arranged in staggered rows on the two edges of the same plate so as to allow an interlocking when the two panels 10E-1 and 10F-2 are brought together.

When these two panels are juxtaposed and adjusted, it is possible to cotter these two panels by means of a vertical rod 30, able to be introduced into the pins 28-1D and 28-2G of the two panels.

Likewise, in an upper part, trailing chain reinforcements 32 are left in reserve and projecting.

The exterior surface 14 is equipped with necessary margins R while the interior surface is juxtaposed, contiguous edge to edge. The interior surface forms the interior framework and is perfectly continuous.

It is then advisable to install a flat framework to pour a light concrete into this margin R, preferably of the same nature as the one that composes the exterior surface that thus makes it possible to embed the reinforcements, to connect the panels as well as the trailing chain reinforcements. It is again noted that the thermal bridges are avoided since the interior surface 12 is continuous.

Figure 3:
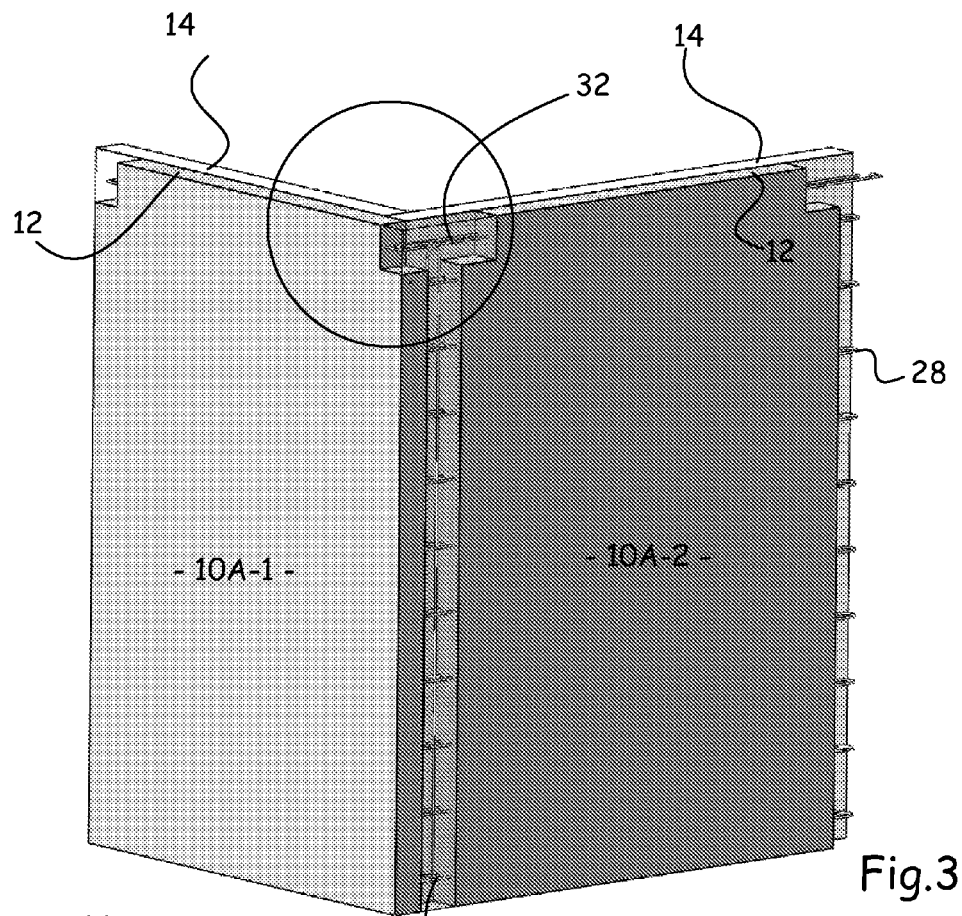
Figure 4:
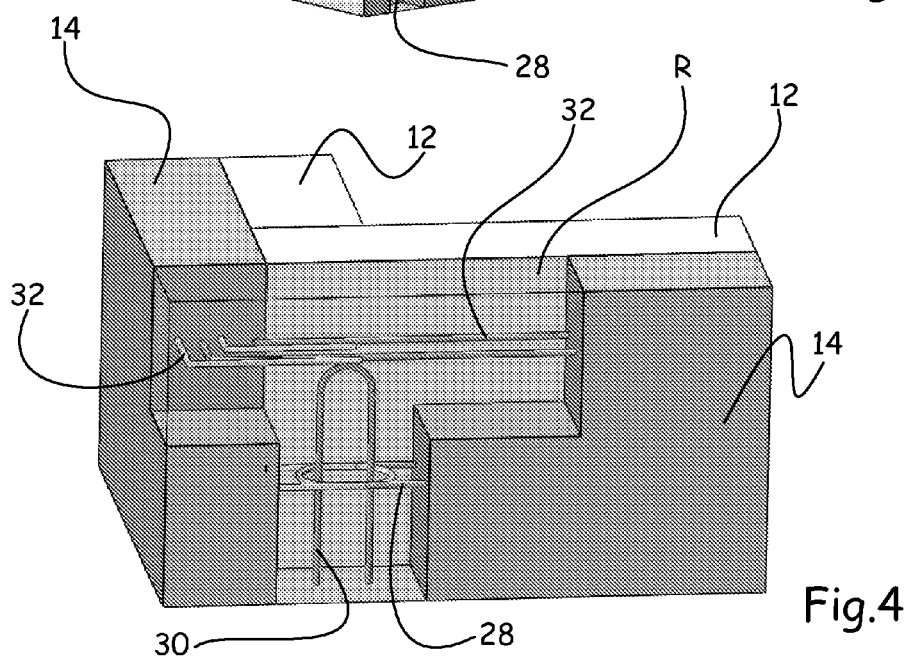

In the case of an angle, as shown in FIG. 3 and in detail in FIG. 4, the margin R is in the shape of a T for providing an embodiment, made on a surface of one 10A-1 of the panels 10A-1 and 10A-2.

The chain reinforcements 32 are bent to ensure continuity and enough superposition of lengths to ensure satisfactory mechanical setting.

The rod 30 is introduced in the same way as above in the pins 28 that are arranged in staggered rows. It is noted that in the preferred embodiment, one of the panels has pins that are arranged in a perpendicular manner to the general plane of the panel so as to put the pins in staggered rows in the plane of a panel and not at an angle.

The interior surfaces 12, made of natural-fiber concrete, ensure the continuity of the insulation.

In the same way as above, light concrete of the same nature as that that constitutes the exterior surface 14 is poured into a framework, in situ, once the panels are positioned in a suitable way to fill in the margin R and to embed the reinforcements.

Figure 5:
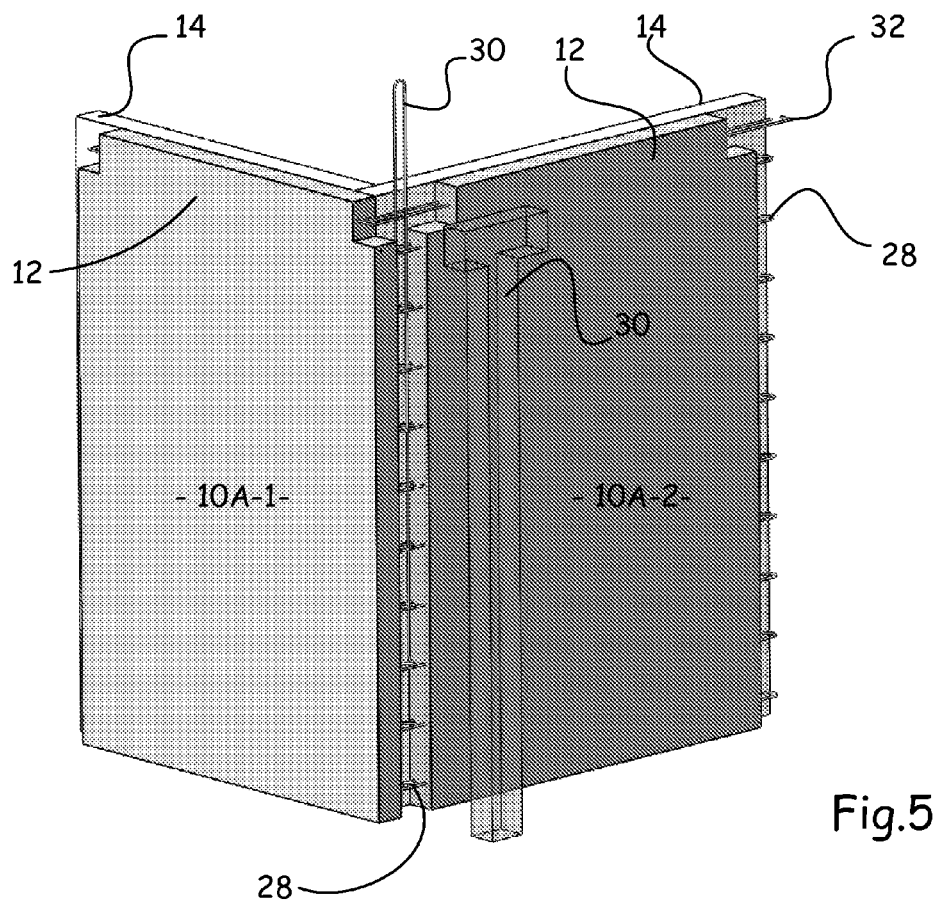
Figure 6:
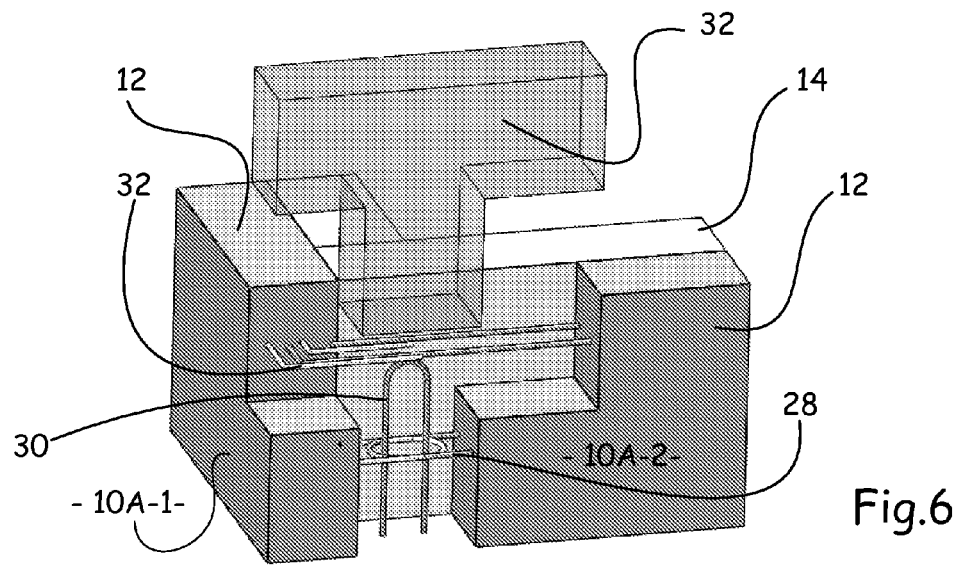

The volume of concrete to be added is clearly seen in FIGS. 5 and 6 where the light concrete is transparent.

Figure 7:
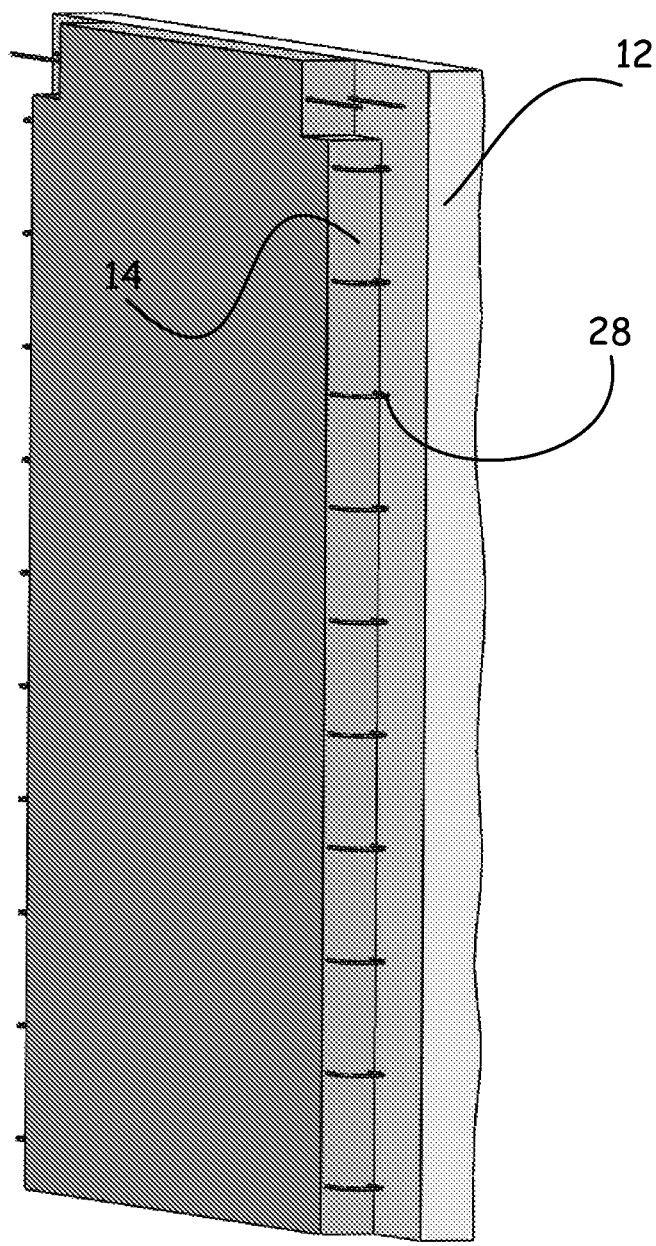
Figure 8A:
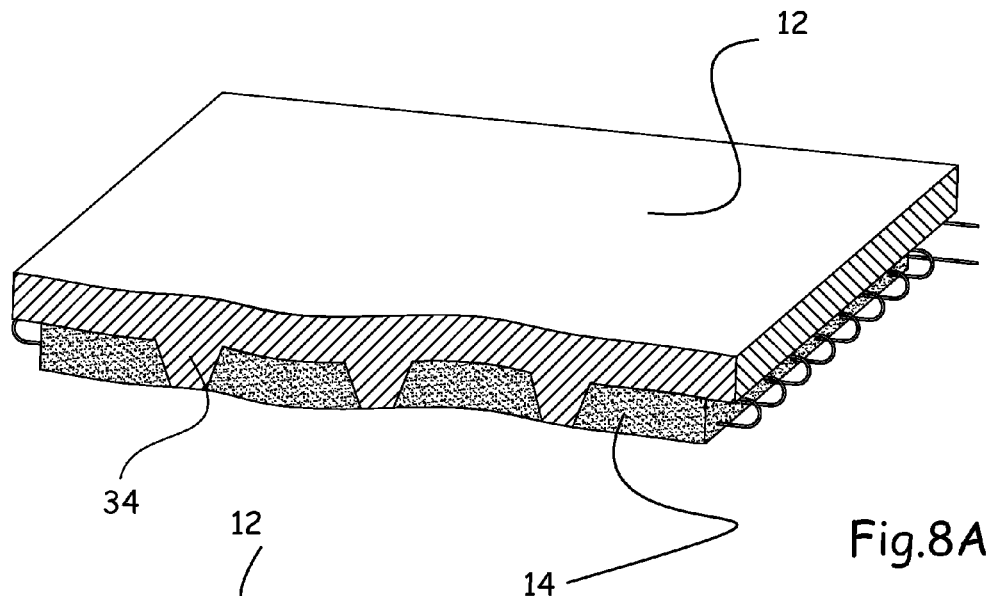
Figure 8B:
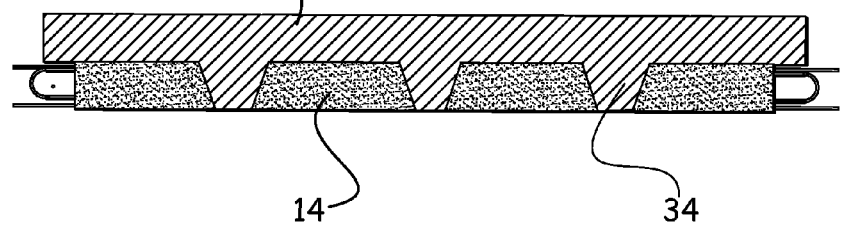
Figure 8C:
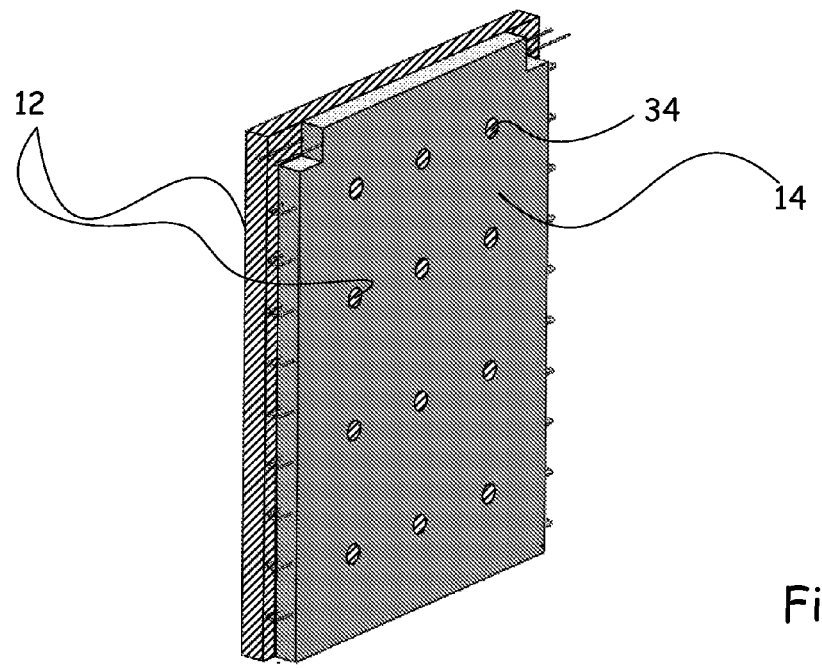

FIG. 7 shows one of the possibilities that the process according to this invention offers.

Above, it was indicated that the casings of door frames and cable networks or other connecting means could be integrated in the interior surface, made of insulating concrete that is based on natural fibers.

This interior surface can also make it possible to achieve aesthetic effects that are structured as waves or undulations, to only cite the latter.

This depends on the mold M that is used and that can have any aesthetic shape.

This does not at all modify the technical nature of the panel but this makes possible aesthetic configurations that it was not possible to obtain with plaster plate panels, for example.

The exterior surface is smoothed during the manufacturing to subsequently enable the application of any finish, any wall facing, or any coating.

These panels being connected to one another, it is necessary to make them integral with the remainder of the structure. Depending on the embodiment of the slab, reinforcements in reserve, connecting rods that are attached and bonded so as to provide grounding, will be provided. These reinforcements are in reserve, prepositioned to the right of the posts to be made and also come into the pins 28 such as the rod 30, simultaneously reinforcing the cottering.

In a known way, the floor is made to float.

In the upper part, the walls accommodate the framework in a known way, and the pinions are made with the framework and not with the walls as in traditional construction.

The process for production according to this invention is very effective from the insulation standpoint.

If the wall that is mentioned in the example is finished after assembly by an exterior coating or a 1.5 cm cladding and on the interior a lime coating of 1.5 cm at the most, the following results are obtained:

| Components | ρ sec (kg/m$^3$) | Thickness (m) | λ (W/m.K) | R (m$^2$.K/W) |
|---|---|---|---|---|
| Coating/Cladding | 800.00 | 0.015 | 0.17 | 0.09 |
| Structural Concrete | 1,550.00 | 0.180 | 0.70 | 0.26 |
| Hemp Concrete | 350.00 | 0.180 | 0.08 | 2.25 |
| Hemp Coating | 800.00 | 0.015 | 0.17 | 0.09 |
| FINISHED WALL | | 0.39 | | 2.85 |

The heat loss value Up of such a wall is 0.36 m2.K/W.

Each panel has a weight that is generally less than 4 tons to enable lifting and manipulation with a construction site conveyor.

The process according to the invention is therefore to be very industrializable by resorting to known and already existing means of production.

The panels that are produced are well insulating, simple to install and perfectly sized with a high reproducibility.

So as to facilitate drying at the interface and to prevent, if necessary, any condensation between the two volumes of structural concrete and natural-fiber concrete, this invention proposes, as illustrated in FIG. 8, the production of contact plates 34 that are manufactured with the natural-fiber concrete wall and that extend through the structural concrete wall.

One simple embodiment consists in providing inserts that are placed in the structural concrete panel, tapered in particular, which are removed before the structural concrete is completely set.

During the pouring of the natural-fiber concrete, the latter covers the structural concrete panel and fills in the housings left free by the removal of inserts that form contact plates 34.

The invention claimed is:

1. A process for the production of panels with integrated insulation, comprising:
   pouring concrete that includes natural fibers into a mold to form an interior surface of said panel;
   pouring light hydrophobic concrete, with reinforcements, to form an exterior surface of said panel; and
   reinforcing an edge of each panel to ensure cottering of chain reinforcements.

2. The process for the production of panels according to claim 1, further comprising an additional stage for deposition of a silica material layer in an interface between the interior surface and the exterior surface.

3. The process for the production of panels according to claim 2, wherein mechanical connectors are inserted between the interior surface and the exterior surface during the pouring so as to connect the interior surface and the exterior surface mechanically.

4. The process for the production of panels according to claim 1, wherein mechanical connectors are inserted between the interior surface and the exterior surface during the pouring so as to connect the interior surface and the exterior surface mechanically.

5. The process for the production of panels according to claim 1, wherein the natural fibers include natural hemp fibers.

6. The process for the production of panels according to claim 1, wherein casings of door frames, sheathings of fluid and electrical networks, and connection housings are prepositioned in advance in the mold M, in the interior surface.

7. A construction panel, made from the process according to claim 1, wherein the construction panel comprises a structured insulating surface.

8. The construction panel according to claim 7, wherein hemp comprises the natural fiber and wherein the construction panel has the following composition:
   interior surface:
   fibrous reed: 11.0%
   standard reed: 5.5%
   lime binder: 34.0%
   sufficient quantity of water
   exterior surface:
   cement: 23.0%
   sand: 40.0%
   0/5 expanded clay: 12.0%
   5/15 expanded clay: 12.0%
   sufficient quantity of water.

9. The process for the production of panels according to claim 1, wherein the panels are for the production of buildings.

10. A process for producing a panel, comprising:
    forming an interior surface from a mixture of concrete and natural fibers by pouring into a mold to form a monolithic layer, the natural fibers being selected from the group consisting of hemp fibers, flax fibers, straw fibers or wood fibers;
    forming an exterior surface from light hydrophobic concrete; and
    reinforcing an edge of the panel to ensure cottering of chain reinforcements.

11. The process according to claim 10, further comprising an additional step of depositing a silica material layer in an interface between the interior surface and the exterior surface.

12. The process according to claim 10, wherein mechanical connectors are inserted between the interior surface and the exterior surface during the pouring so as to connect the interior surface and the exterior surface mechanically.

13. The process according to claim 10, wherein the natural fibers include natural hemp fibers.

14. The process according to claim 10, wherein casings of door frames, sheathings of fluid and electrical networks, and connection housings are prepositioned in advance in the mold M, in the interior surface.

15. A construction panel, made from the process according to claim 10, wherein the construction panel comprises a structured insulating surface.

16. The construction panel according to claim 15, wherein hemp comprises the natural fiber and wherein the construction panel has the following composition:
    interior surface:
    fibrous reed: 11.0%
    standard reed: 5.5%
    lime binder: 34.0%
    sufficient quantity of water
    exterior surface:
    cement: 23.0%
    sand: 40.0%
    0/5 expanded clay: 12.0%
    5/15 expanded clay: 12.0%
    sufficient quantity of water.

17. The process for the production of panels according to claim 10, wherein the panels are for the production of buildings.

* * * * *